US012732517B1

(12) United States Patent
Chernick

(10) Patent No.: US 12,732,517 B1
(45) Date of Patent: Sep. 8, 2026

(54) NETWORK DATA TRAFFIC MONITOR AND ANALYZER

(71) Applicant: Celerium Inc., Torrance, CA (US)

(72) Inventor: Aubrey Grant Chernick, Brentwood, CA (US)

(73) Assignee: Celerium Inc., Torrance, CA (US)

( * ) Notice: Subject to any disclaimer, the term of this patent is extended or adjusted under 35 U.S.C. 154(b) by 0 days.

(21) Appl. No.: 19/459,910

(22) Filed: Jan. 26, 2026

(51) Int. Cl.
*H04L 9/40* (2022.01)

(52) U.S. Cl.
CPC .......... *H04L 63/1416* (2013.01); *H04L 63/02* (2013.01)

(58) Field of Classification Search
CPC ............. H04L 63/1425; H04L 63/1433; H04L 63/1408; H04L 63/1416; H04L 63/02
USPC ..................................................... 726/23, 25
See application file for complete search history.

(56) References Cited

U.S. PATENT DOCUMENTS 12,353,383 B1 * 7/2025 Bao ..................... G06F 16/2237
12,598,158 B2 * 4/2026 Kaligotla ............ H04L 63/0236
2020/0334540 A1 * 10/2020 Borra .................. G06F 11/3003
2022/0239634 A1 * 7/2022 Woodberg ............... G06F 21/51
2023/0076130 A1 * 3/2023 Wen ...................... G06F 11/261
2023/0164043 A1 * 5/2023 Sirov .................. H04L 41/5032 709/224
2024/0184857 A1 * 6/2024 Volkovich ............... G06F 18/22
2025/0286899 A1 * 9/2025 Shriver ............... H04L 63/1416
2026/0075063 A1 * 3/2026 Kulakowski ........ H04L 63/1416
2026/0081932 A1 * 3/2026 Mohamed et al. . H04L 63/1416

* cited by examiner

*Primary Examiner* — Syed A Zaidi
(74) *Attorney, Agent, or Firm* — TIPS Group

(57) ABSTRACT

A network data traffic monitor and analyzer including at least one digital processor, a network interface coupled to the digital processor, and digital memory including code segments for: (a) receiving north-south network flow telemetry; (b) resolving the destination network identifiers into domain or organizational identifiers, (c) developing and storing persistent domain-centric relationship records, (d) establishing baseline relationship profiles between network sources and destinations over at least one observation window; (e) comparing current network flow telemetry against the baseline relationship profiles to identify structural relationship deviations, and (f) reporting at least one of the domain-centric relationship records and the structural relationship deviations.

30 Claims, 4 Drawing Sheets

14‴
14″
14′
10
12′
18′
LAN(1)
FW(1)
22′
14
16
42′
20′
40′
NFTM
DNIM
DCRM
BRPM
SRDM
NFRM
24
26
30
32
36
38
44′
44″
INTERNET
S(1)
S(m)
20″
12″
42″
LAN(n)
FW(n)
22″
18″
40″

50
48
16′
56
HIGH SPEED SRAM CACHE MEMORY
CPU
POWER-ON RESET
54
53
52
BIOS
CAM
DRAM (MAIN MEMORY)
46
46
NON-VOLATILE MEMORY
NETWORK INTERFACE
I/O
58
60
62

80

Persistent Relationship Records as First-Class Analytical Objects

| Relationship Record Identifier | Source Identifier | Destination Identifier | Pairing Type | Directionality Metadata | Temporal Metadata | Lifecycle State | Summary Attributes |
|---|---|---|---|---|---|---|---|
| RR-001 | Internal Application A | example-service.com | Domain-to-Domain | Source-initiated | First observed: $T_1$; Last observed: $T_3$ | Ongoing | Observed across multiple windows |
| RR-002 | Internal Service B | 203.0.113.45 | Domain-to-IP | Bidirectional | First observed: $T_2$; Last observed: $T_2$ | Newly observed | Single observation window |
| RR-003 | Internal Workload C | Cloud Provider X | Domain-to-Organization | Source-initiated | First observed: $T_0$; Last observed: $T_3$ | Ongoing | Persistent over baseline period |
| RR-004 | Internal System D | Unresolved External IP Range | IP-to-IP | Destination-responsive | First observed: $T_1$; Last observed: $T_1$ | Inactive | No recent observations |
| RR-005 | Internal Function Group E | Third-Party AI Service | Domain-to-Service | Asymmetric workflow | First observed: $T_2$; Last observed: $T_3$ | Ongoing | Inferred service interaction |

*Fig. 4*

NETWORK DATA TRAFFIC MONITOR AND ANALYZER

BACKGROUND

Complex computing environments increasingly rely on large numbers of interconnected systems whose interactions evolve over time due to scaling, migration, modernization, and third-party integration. Existing techniques for analyzing network-derived telemetry have historically focused on evaluating traffic events for behavioral characteristics, usage patterns, or potential misuse. Such approaches typically treat communications as transient events rather than as evidence of enduring system-to-system relationships.

As a result, known systems often lack the ability to determine which relationships exist within an environment, when those relationships were established, whether they persist over time, or how they change as architectures evolve. Telemetry is commonly processed in near-real-time windows optimized for event interpretation, limiting visibility into structural trends such as gradual architectural drift, relationship emergence, or relationship retirement.

Additionally, prior approaches frequently evaluate telemetry in isolation within a single environment, without providing mechanisms for comparative normalization across peer systems, organizations, or industry baselines. This absence of contextual structural comparison constrains the ability to understand whether observed relationships reflect common architectural patterns or represent atypical configurations relative to comparable environments.

Consequently, existing solutions provide limited support for maintaining accurate, up-to-date architectural representations, governing system relationships over time, or supplying durable evidence for oversight, documentation, or compliance purposes. These limitations become more pronounced as environments grow in scale, complexity, and rate of change.

These and other limitations of the prior art will become apparent to those of skill in the art upon a reading of the following descriptions and a study of the several figures of the drawing.

SUMMARY

An example network data traffic monitor and analyzer includes: at least one digital processor; a network interface coupled to the digital processor; and digital memory including code segments executable by the at least one digital processor for (a) receiving north-south network flow telemetry via the network interface, the north-south network flow telemetry including metadata derived from at least one of a firewall, a router, or a cloud flow logging service without packet payload inspection, the north-south network flow telemetry including source and destination network identifiers, (b) resolving the destination network identifiers into domain or organizational identifiers, (c) developing and storing persistent domain-centric relationship records representing observed communication pairings between network sources and destinations as first-class analytical objects, (d) establishing baseline relationship profiles between network sources and destinations over at least one observation window of time, (e) comparing current network flow telemetry against the baseline relationship profiles to identify structural relationship deviations, and (f) reporting at least one of the domain-centric relationship records and the structural relationship deviations.

An example computer-implemented method for network data traffic monitoring and analysis includes: (a) receiving north-south network flow telemetry via a network interface of a computer, the north-south network flow telemetry including metadata derived from at least one of a firewall, a router, or a cloud flow logging service without packet payload inspection, the north-south network flow telemetry including source and destination network identifiers; (b) resolving the destination network identifiers into domain or organizational identifiers on the computer; (c) developing and storing persistent domain-centric relationship records representing observed communication pairings between network sources and destinations as first-class analytical objects on the computer; (d) establishing baseline relationship profiles between network sources and destinations over at least one observation window of time on the computer; (e) comparing current network flow telemetry against the baseline relationship profiles to identify structural relationship deviations on the computer; and (f) reporting at least one of the domain-centric relationship records and the structural relationship deviations by the computer.

Embodiments of the network data traffic monitor and analyzer advantageously discover, maintain, and reason about system-to-system relationships in complex networks to produce a living architectural representation of the network over time.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 4 is an example table of relationship records; and

DETAILED DESCRIPTION OF EXAMPLE EMBODIMENTS

Figures 1, 2:
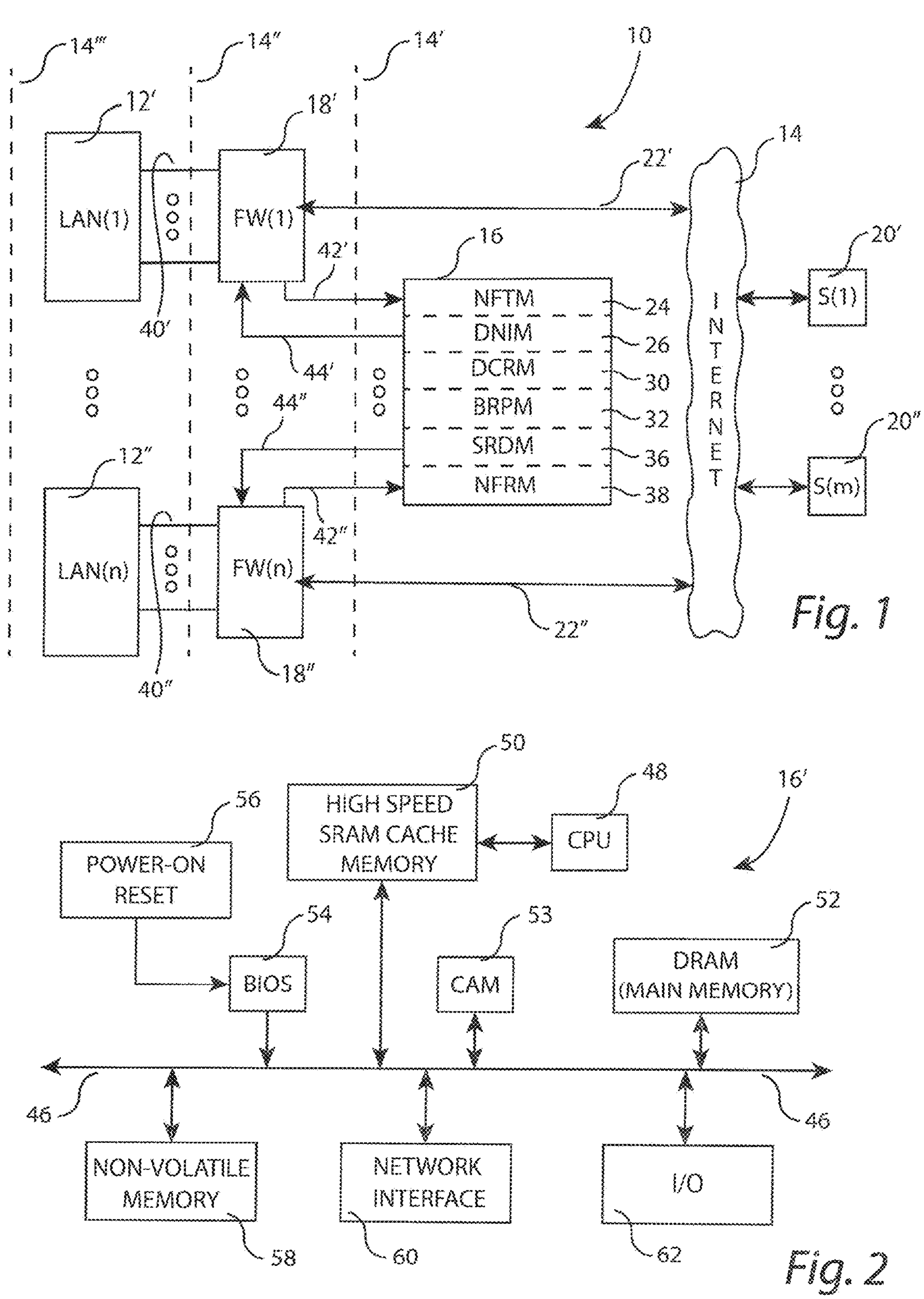
FIG. 1 is a block diagram of an example network system.
FIG. 2 is a block diagram of an example network data traffic monitor and analyzer.

In FIG. 1, an example network system 10 includes a number of private networks 12', 12", a public network 14, a network data traffic monitor and analyzer 16, and a number of firewalls 18', 18" coupling the private networks 12', 12" to the public network 14. A number of endpoint servers 20', 20" are coupled to the public network 14 for potential communication with a private network 12', 12" via communication links 22', 22" of associated firewalls 18', 18", including outbound and incoming internet traffic to the endpoint servers 20', 20". In this example, the private networks 12', 12" are each a local area network (LAN) of, for example, a private business or other entity. Private networks 12', 12" represent the first and last of "n" LANs, i.e., LAN(1) to LAN(n).

The public network 14 is preferably a publicly available wide area network (WAN), such as the internet, implementing internet protocols such as TCP/IP protocols. In addition to being a communication path, public network 14 can provide a number of cloud services such as cloud firewalls, virtual private networks (VPNs), cloud computing, application workflow engines, software as a service (SaaS), artificial intelligence (AI) systems, cloud data storage, etc. For example, the public network 14 could be extended to 14' such that the network data traffic monitor and analyzer 16 is implemented with cloud computing, e.g., with Amazon Web Services (AWS), or to 14" such that the firewalls 18', 18" are implemented as AWS firewalls, or to 14'", such that the LANS 12', 12" are implemented as AWS LANs.

In this example, network data traffic monitor and analyzer 16 is implemented by one or more servers, each of which has one or more processors, such as by one or more physical servers as illustrated in FIG. 2, or by cloud computing using, for example, AWS. The network data traffic monitor and analyzer 16 of this example includes a number of core modules and registries 24, 26, 30, 32, 36, and 38, which embody computer-implemented processes and data structures of the system. More particularly, in this example the core modules and registries of network data traffic monitor and analyzer 16 includes a Network Flow Telemetry Module (NFTM) 24, a Destination Network Identification Module (DNIM) 26, a Domain-Centric Relationship Module (DCRM) 30, a Baseline Relationship Profile Module (BRPM) 32, a Structural Relationship Deviation Module (SRDM) 36, and a Network Flow Reporting Module (NFRM) 38.

In this example, the network data traffic monitor and analyzer 16 receives firewall traffic metadata streams 42', 42" from firewalls 18', 18", respectively, and can optionally provide firewall block lists 44', 44" to the firewalls 18', 18". It is important to note that the network data traffic monitor and analyzer 16 does not have access to the internet traffic on communication links 22', 22", but only to the firewall traffic metadata streams 42', 42", e.g., Layer 3 (network layer) metadata, i.e. it does not engage in deep packet inspection (DPI). This is an important security feature in that it prevents the operator of the network data traffic monitor and analyzer 16 from being privy to internet traffic communications to and from the private networks 12', 12".

With continuing reference to the example of FIG. 1, the firewalls 18', 18" are preferably commercially available hardware firewalls available from a number of manufacturers including Cisco Systems, WatchGuard, Fortinet and Barracuda Networks. As noted previously, in other embodiments the firewalls 18', 18" can be implemented using cloud services provided by AWS or others. Each firewall 18', 18" includes one or more private network ports coupled to LANs 12', 12" as seen by data paths 40', 40", and a public network port coupled to the internet by communication links 20', 22".

The firewall traffic metadata streams can be created by, for example, using Syslog and/or NetFlow protocols. While these protocols serve similar purposes, there are some key differences between them. Syslog is a standard protocol used for forwarding system log messages from one device to another. It is primarily used for collecting log data from various network devices, such as routers, switches, and servers. Syslog messages contain information about events that occur on the device, including security alerts, system errors, and other messages. The data is stored in text files and can be analyzed using various tools. NetFlow, on the other hand, is a network protocol developed by Cisco that is used for traffic analysis and network monitoring. It collects and records information about network traffic flows, including the source and destination addresses, the type of traffic, and the amount of data transferred. NetFlow is used to identify network usage patterns, monitor network performance, and detect security threats. In terms of similarities, both Syslog and NetFlow are used to collect and analyze data about network activity, and both are widely used in network monitoring and management.

Communication between devices of the network system 10 comprise digital data packets having headers (and sometimes trailers and/or footers) which provide information about the data packet's contents, origination and destination in accordance with internet protocols. For example, an Internet Protocol (IP) packet has a header that contains information about where a packet is from (its source IP address), where it is going (destination IP address), how large the packet is, and how long network routers should continue to forward the packet before dropping it. It may also indicate whether or not the packet can be fragmented and include information about reassembling fragmented packets.

In FIG. 2, a block diagram of a network data traffic monitor and analyzer 16', set forth by way of example and not limitation, includes a local bus 46 and a Central Processing Unit (CPU) 48 coupled to the local bus 46 by high-speed Static Random Access Memory (SRAM) cache memory 50. Dynamic Random Access Memory (DRAM) primary or "main" memory 52 is coupled to cache memory 50 and to the bus 46. Content Addressable Memory (CAM) 53 or other content-searchable data storage may also be provided in some embodiments. Basic Input/Output System (BIOS) 54 is coupled to bus 46 and can be reset by power-on reset 56. The network data traffic monitor and analyzer 16' also includes non-volatile memory 58, such as "flash" memory or a hard drive, network interface 60, and other input/output (I/O) interfaces 62.

Figure 3:
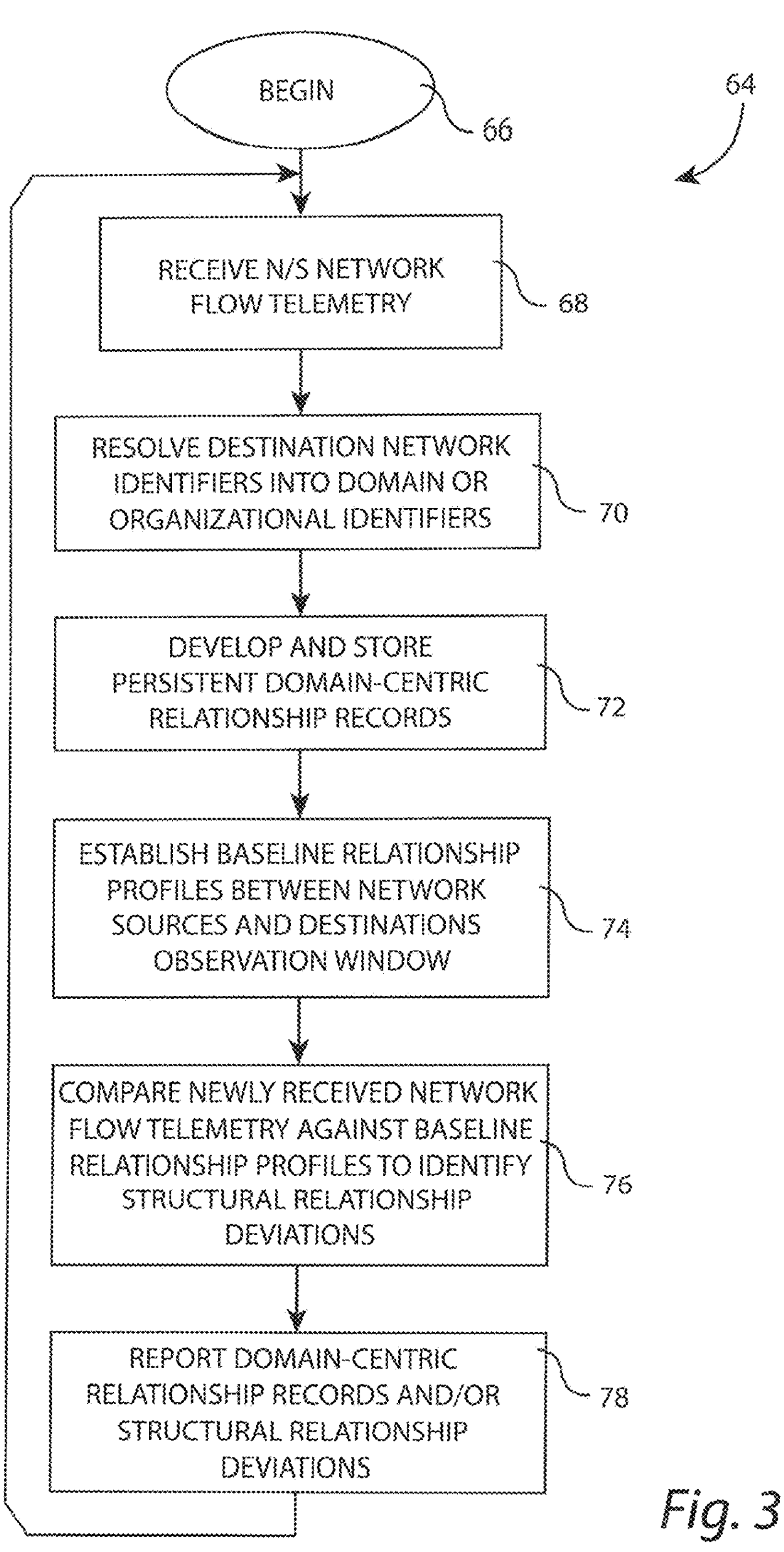
FIG. 3 is a flow diagram of a process for monitoring and analyzing network data traffic flow.

FIG. 3 is a flow diagram of a process 64 for monitoring and analyzing network data traffic flow which can be implemented by the computer system of FIG. 2. The process 64 begins at 66 and, in an operation 68, North-South (N/S) network flow telemetry is received. In an embodiment, operation 68 can be implemented by Network Flow Telemetry Module (NFTM) 24. Next, in an operation 70, destination network identifiers are resolved into domain or organizational identifiers. In an embodiment, operation 70 can be implemented by Destination Network Identification Module (DNIM) 26. Persistent domain-centric relationship records are then developed and stored in an operation 72. Then, in an operation 74, baseline relationship profiles are established between network sources and destinations during a timed observation window. Current network flow telemetry is then compared to the baseline relationship profiles to identify structural relationship deviations in an operation 76, and an operation 78 reports and/or displays results, such as domain-centric relationship records and/or structural relationship deviations.

An example Network Flow Telemetry Module (NFTM) 24 includes code segments executed by one or more processors and configured to ingest north-south network flow telemetry generated by existing network infrastructure without modification to such infrastructure, without deployment of endpoint agents, and without inspection of packet payload contents. As used herein, the term "north-south" refers to network communications that traverse an administrative, organizational, account, tenant, or trust boundary between internal systems and external network destinations, including ingress traffic from external networks to internal systems and egress traffic from internal systems to external networks, regardless of protocol or application context. As used herein, "network flow telemetry" refers to metadata describing observed network communications, including source and destination identifiers, transport-layer attributes, and timing information, without application-layer inspection.

In this example, NFTM 24 ingests flow metadata produced by existing network infrastructure, including perimeter firewalls, routers, layer-3 or layer-4 network devices, network address translation gateways, load balancers, virtual network gateways, and cloud-provider flow logging services. In cloud environments, such telemetry may include, without limitation, Amazon Web Services Virtual Private Cloud (VPC) Flow Logs and related gateway or load balancer logs, Microsoft Azure Network Security Group and virtual network flow logs, Google Cloud Platform VPC Flow Logs, or equivalent constructs provided by other infrastructure or platform service providers. Telemetry may be received via streaming delivery, event publication, log ingestion, message queues, object storage ingestion, batch export mechanisms, or combinations thereof.

The ingested telemetry may include source network identifiers such as internal IP addresses, subnets, instance identifiers, or virtual interface identifiers, and destination network identifiers such as external IP addresses, service endpoints, or gateway addresses. The telemetry may further include transport-layer metadata including protocol identifiers, ports, or session indicators, timestamps or durations, directional indicators inferred from session metadata or flow flags, and cloud-specific resource metadata such as account, tenant, virtual network, subnet, security group, availability zone, region, or resource tag identifiers. Such metadata is ingested as authoritative evidence of observed connectivity and is not modified to infer application semantics, behavioral intent, or security significance.

It should be noted that the NFTM 24 can exclusively on existing network identifiers present in the ingested telemetry. As used herein, "existing network identifiers" refers to identifiers already assigned by network infrastructure or cloud platforms for routing, addressing, billing, or operational purposes, including IP addresses, cloud-assigned resource identifiers, virtual network constructs, or gateway identifiers. No new identifiers need be injected into the network, and no instrumentation of applications, workloads, or endpoints is required.

In some embodiments, the NFTM 24 determines whether an observed communication constitutes north-south connectivity by evaluating criteria including association of a source identifier with an internal system registry, determination that a destination identifier lies outside defined internal address spaces or cloud accounts, traversal of designated ingress or egress control points, or account, tenant, or project boundary metadata. Such determination may be performed using deterministic rules or configurable heuristics and does not require interpretation of application intent, user behavior, or policy compliance.

Upon ingestion, heterogeneous telemetry formats are preferably normalized into a canonical internal representation. Normalization may include de-duplication of flow records, consolidation of bidirectional sessions, temporal aggregation into observation windows, association of source identifiers with internal system records, and retention of destination identifiers in resolved or unresolved form. This normalization transforms transient flow events into stable analytical inputs suitable for construction of persistent relationship records, without asserting magnitude, frequency, policy compliance, or security relevance.

An example Destination Network Identification Module (DNIM) 26 includes code segments executed by one or more processors and configured to resolve destination network identifiers derived from north-south network flow telemetry into one or more higher-order identifiers, including domain identifiers, organizational identifiers, or combinations thereof. As used herein, a "destination network identifier" refers to a network-level identifier observed in telemetry that identifies an external communication endpoint, including an IP address, address range, service endpoint, gateway address, load balancer address, or virtual network or interface identifier associated with external connectivity. As used herein, a "domain identifier" refers to a domain name, parent domain, or canonical service domain associated with a network endpoint, and an "organizational identifier" refers to an identifier representing an organization, provider, supplier, or administrative entity associated with a network endpoint, independent of any assertion of ownership or control.

In this example, the DNIM 26 receives destination network identifiers obtained from ingested telemetry as observed and operates on such identifiers without modification of network traffic, without insertion of inline components, and without inspection of packet payload contents. The resolution process transforms low-level network identifiers into stable, higher-order identifiers suitable for constructing persistent, domain-centric relationship records, without requiring application-layer decoding or authoritative control over the resolved entities.

In some embodiments, destination identifier resolution is performed using a multi-stage pipeline in which one or more resolution techniques are applied sequentially, in parallel, or conditionally. The resolution module may associate destination identifiers with domain identifiers by querying reverse Domain Name System records corresponding to destination IP addresses, correlating destination IP addresses with domain names obtained from DNS telemetry, resolver logs, or cached name-to-address mappings, or associating destination identifiers with domain names derived from cloud provider metadata such as service endpoints or load balancer DNS names. Domain name resolution may yield fully qualified domain names, parent domains, canonical service domains, or combinations thereof.

In cloud computing environments, DNIM 26 may further associate destination identifiers with cloud-managed services or organizational entities using control-plane metadata. Such metadata may include cloud resource identifiers, account or subscription identifiers, project identifiers, service endpoints, region metadata, resource labels, service tags, or similar constructs obtained from cloud provider APIs, configuration inventories, or telemetry streams. This information may be used to associate destination traffic with a particular cloud service, provider, or administrative domain without asserting control or intent.

In some embodiments, DNIM 26 consults registry-based or curated data sources to associate destination identifiers with organizational entities. Such sources may include publicly available IP-to-organization registries, commercially available domain or service attribution datasets, or curated internal registries mapping known partners, suppliers, or service providers to network identifiers. Associations derived from such sources are treated as attribution metadata rather than authoritative assertions.

In some embodiments, DNIM 26 applies heuristic or correlative techniques to infer domain or organizational association, including evaluation of repeated co-occurrence of destination identifiers with known domains, stability of destination identifiers across observation windows, consistency of transport-layer attributes indicative of particular service classes, or correlation with workflow execution metadata or orchestration logs referencing external services. Such inference may be probabilistic and may include confidence indicators associated with the inferred association.

Resolution is not required to produce a single definitive identifier. A destination network identifier may resolve to multiple candidate domain or organizational identifiers, resolution may be partial such that an organizational identifier is produced without a specific domain name, or an identifier may remain unresolved and be retained in IP-centric form. Persistent relationship records may therefore include resolved identifiers, unresolved identifiers, or combinations thereof, enabling heterogeneous pairing types.

In some embodiments, resolved identifiers are annotated with contextual or directional metadata indicating whether a destination entity primarily receives communications, initiates responses, or participates in asymmetric or service-oriented workflows, including interactions involving artificial intelligence components. The resolution module preserves the original destination network identifier alongside any resolved identifiers to maintain traceability between raw telemetry and constructed relationship records.

In some embodiments, the DNIM 26 may associate detected domain names with known organizations, including enriched attributes such as hosting provider classifications, cloud tenancy boundaries, or affiliation with third-party platforms. This mapping may enable identification of whether a given destination is operated directly by a business partner, hosted by a shared provider, or part of an unknown external infrastructure. Such distinctions can influence structural relationship scoring and help identify new or unusual exposure paths.

The resolution of destination network identifiers as described herein does not assert ownership, control, authorization, or intent of any resolved domain or organization, does not require validation by the resolved entity, and does not imply contractual, policy, or trust relationships. Resolution serves solely to enable structural relationship analysis based on observed connectivity.

By resolving destination network identifiers into domain or organizational identifiers using metadata-driven, cloud-aware, registry-augmented, and heuristic techniques, the system converts ephemeral network-level observations into durable, domain-centric identifiers suitable for persistent relationship modeling, baselining, and longitudinal analysis. This resolution capability enables identification and analysis of dependencies between internal systems and external organizations over time without packet inspection, application-layer access, or enforcement actions.

An example Domain-Centric Relationship Module (DCRM) 30 includes code segment executed by one or more processors and configured to construct and store persistent, domain-centric relationship records that represent observed communication pairings as durable analytical objects distinct from individual network flow events. As used herein, a "relationship record" denotes a data structure that captures the existence and structural characteristics of observed connectivity between an internal source system and an external destination entity over an observation window, rather than representing packets, sessions, or discrete flow records.

The example DCRM 30 receives normalized north-south network flow metadata produced by a telemetry ingestion module, resolved or partially resolved destination identifiers produced by a destination identifier resolution module, source system identifiers obtained from an internal system registry, and optional directional or contextual metadata indicating initiation or predominant direction of communication. The module operates exclusively on metadata-level inputs and does not require packet payload inspection, deep packet analysis, or application-layer decoding.

For a given observation window, the DCRM 30 evaluates ingested and normalized telemetry to determine whether communication has occurred between a particular source identifier and a particular destination identifier. Upon detection of such communication, the module constructs one or more relationship pairings in which the source and destination identifiers may each be represented as a resolved domain identifier, an unresolved network identifier, or a combination thereof. As used herein, a "pairing type" refers to the classification of a relationship based on the identifier forms used for the source and destination, including domain-to-domain, domain-to-network identifier, network identifier-to-domain, or network identifier-to-network identifier pairings. Selection of a pairing type is dependent on the resolution state of the identifiers and does not require complete or authoritative resolution in order to create a persistent record.

Individual packets, sessions, or flow events are treated as transient observations. The DCRM 30 aggregates such transient observations within an observation window to determine whether a stable communication relationship exists. In some embodiments, a relationship record is created or updated when at least one qualifying communication event is observed during the observation window. In other embodiments, configurable aggregation criteria are applied, such as requiring repeated observations, temporal persistence, or a minimum observation duration before a relationship is treated as stable. Irrespective of the applied criteria, the resulting relationship record represents structural connectivity between entities rather than traffic volume, throughput, or performance characteristics.

Each persistent relationship record may include a source identifier corresponding to an internal system, application, or functional grouping; a destination identifier corresponding to a resolved domain, organizational entity, service, or unresolved network identifier; pairing type metadata indicating the identifier forms used; directional metadata indicating initiation or predominant direction of communication; temporal metadata indicating first observation, most recent observation, or active observation windows; and optional summary attributes derived from telemetry, such as frequency or temporal distribution, without storing individual flow records. Relationship records are explicitly decoupled from the underlying flow metadata from which they are derived.

Constructed relationship records are preferably stored as first-class analytical objects in a persistent data store that is logically separate from raw or normalized telemetry logs. As used herein, "first-class analytical objects" refers to data entities that are directly addressable, queryable, and comparable without reference to underlying flow events, that persist across observation windows even as raw telemetry is aged out or discarded, and that are updated to reflect changes in observed connectivity rather than accumulation of raw events. This storage model enables structural analysis of connectivity that is resilient to network noise, sampling artifacts, and telemetry retention policies.

In FIG. 4, an example persistent relationship table 80 illustrates how relationship records can be stored as a discrete, first-class analytical object representing structural connectivity between a source identifier and a destination identifier over one or more observation windows. The relationship records persist independently of individual flow records and are not tied to packet-level or session-level telemetry. Pairing type metadata indicates the identifier forms used, while directionality and temporal metadata preserve contextual information relevant to structural analysis. Lifecycle state reflects the relationship's status relative to subsequent observations or baselines, and summary attributes provide optional high-level characteristics without retaining underlying flow events. The persistent relationship table of FIG. 4 is exemplary and non-limiting, and additional, fewer, or alternative fields may be included.

Persistent relationship records may be stored or materialized using one or more data representations suitable for relationship-centric analysis, including graph-based representations in which entities are modeled as nodes and relationships as edges, tabular representations indexed by source and destination identifiers, or matrix representations encoding source-to-destination or destination-to-source relationships. Multiple representations may coexist and be derived from a common underlying relationship record schema.

In some embodiments, relationship records further include lifecycle state information indicating whether a relationship is newly observed, ongoing, inactive, or absent relative to a baseline. Lifecycle state transitions are determined by subsequent analysis of telemetry and relationship updates and do not require deletion or recreation of the underlying relationship record, thereby preserving historical continuity.

In some embodiments, observed north-south network flow telemetry represents communications between internal systems of a monitored organization and external digitally connected suppliers, partners, service providers, or third-party platforms. In other embodiments, the observed telemetry represents communications between internal systems of the same monitored organization that are deployed across different environments, including distinct on-premises networks, private data centers, cloud environments, virtual private clouds, accounts, tenants, or regions, where such communications traverse an administrative, network, or trust boundary observable at a monitored network control point.

Accordingly, a destination network identifier resolved from north-south telemetry may correspond to an external organizational entity or may correspond to another system, service, or environment operated by the same organization but located outside the originating network segment, cloud account, or deployment boundary. The system does not require that a destination entity be operated by a different organization in order for a communication to be treated as a north-south relationship.

Persistent domain-centric relationship records may therefore represent relationships between owner-operated systems across multiple environments, relationships between owner-operated systems and external suppliers or partners, or combinations thereof, provided that the underlying communication traverses an observable boundary. Such relationships are modeled independently of organizational ownership and reflect structural connectivity across environmental, architectural, or administrative boundaries.

In some embodiments, observed north-south network flow telemetry reflects communications that involve one or more intermediary systems, including workflow engines, integration engines, message brokers, application gateways, or orchestration platforms, that receive, process, transform, or route requests between multiple internal or external systems. Such intermediary systems may be deployed within on-premises environments, cloud environments, or hybrid architectures and may have addressable network identifiers, including IP addresses, CIDR ranges, service endpoints, or virtual interfaces observable at monitored network control points.

In such embodiments, the system may construct persistent relationship records in which the intermediary system is treated as a source entity, a destination entity, or both, based on observed north-south connectivity, even where the underlying telemetry does not directly identify the ultimate upstream or downstream systems associated with a given communication.

In further embodiments, the system ingests supplemental telemetry, logs, or metadata produced by such intermediary systems or associated platforms, including workflow execution logs, integration mappings, message identifiers, correlation metadata, or control-plane signals, in order to associate inbound communications observed at a monitored boundary with outbound communications mediated by the intermediary system. Such association may be deterministic, probabilistic, partial, or directional and does not require complete transaction-level correlation.

Even where full association between inbound and outbound communications is unavailable, the system derives structural relationship insight by identifying intermediary systems as hubs, transit points, or dependency nodes within the observed communication architecture, enabling modeling of indirect connectivity and mediated relationships without inspection of packet payload contents or application-layer data.

By aggregating transient network flow observations into persistent, domain-centric relationship records stored as first-class analytical objects, the system converts ephemeral telemetry into durable structural representations of external connectivity. This technical effect enables baseline modeling, longitudinal comparison, and deviation analysis of organizational dependencies over time without reliance on individual flow events, without packet inspection, and without asserting enforcement, policy, or security intent.

An example Baseline Relationship Profile Module (BRPM) 32 includes code segments executed by one or more processors and configured to establish baseline relationship profiles over one or more observation windows using persistent domain-centric relationship records derived from north-south network flow telemetry. As used herein, the term "baseline relationship profile" means a stabilized structural representation of observed communication relationships between internal source systems and external destination entities over time, where such representation reflects enduring connectivity patterns rather than individual packets, sessions, flow events, or instantaneous measurements. As used herein, the term "observation window" means a defined temporal interval over which relationship existence or persistence is evaluated, which may be fixed in duration, rolling, calendar-aligned, event-aligned, or otherwise temporally bounded according to configurable criteria. Example of observation windows include "Prior 24 Hours" and "December 2025".

The example BRPM 32 receives, as input, persistent relationship records constructed from normalized telemetry, together with temporal metadata indicating when such relationships were first observed, last observed, or active across one or more observation windows, and optionally receives summary relationship attributes (a/k/a attributes of a relationship) derived from telemetry, including frequency, duration, or temporal distribution, without requiring retention of individual flow events. The BRPM 32 operates exclusively on relationship-level abstractions and does not require packet payload inspection, application-layer decoding, or interpretation of application intent.

For each observation window, the BRPM 32 evaluates the set of relationship records active during that window to identify stable structural communication patterns. In some embodiments, a relationship is incorporated into a baseline relationship profile when it satisfies one or more stability criteria, including presence across a minimum number of observation windows, persistence beyond a minimum temporal duration, or recurrence within acceptable variability envelopes. The resulting baseline relationship profile captures the existence and typical structural characteristics of relationships, rather than aggregating traffic volume, throughput, or performance metrics.

Baseline relationship profiles may be represented using one or more data structures encoding structural connectivity, including source-to-destination representations reflecting external dependencies of internal systems, destination-to-source representations reflecting shared external entities accessed by multiple internal systems, or graph-based representations in which nodes correspond to internal or external entities and edges correspond to baseline relationships. Such representations encode durable connectivity structure rather than instantaneous network measurements.

In some embodiments, baseline relationship profiles are constructed in a source-to-destination orientation. As used herein, the term "source-to-destination orientation" means a representation in which relationships are organized according to internal systems and their observed external counterparts. In other embodiments, baseline relationship profiles are constructed in a destination-to-source orientation, meaning a representation in which relationships are organized according to external entities and the internal systems that interact with them. Baseline profiles may further include directional metadata indicating initiation or predominant direction of communication, thereby supporting asymmetric interaction patterns such as application programming interface interactions or artificial intelligence component workflows.

Baseline relationship profiles may be maintained as evolving reference states. In such embodiments, newly observed relationships that satisfy stability criteria may be incorporated into an existing baseline, historical baseline states may be retained to preserve structural context across operational epochs, and baseline evolution may be tracked without overwriting prior baseline representations. This approach enables comparison of current relationship structures against prior baseline states over time.

Baseline relationship profiles are explicitly independent of individual flow events. Once established, a baseline profile persists even if underlying telemetry records are aged out, aggregated, or discarded, and the BRPM 32 does not require retention of packet-level, session-level, or flow-level logs in order to maintain such profiles.

By establishing baseline relationship profiles over one or more observation windows using persistent domain-centric relationship records, the system produces a durable structural reference model of organizational connectivity. This baseline enables subsequent identification of structural relationship deviations, drift, or disruption without reliance on raw flow events, without packet inspection, and without asserting enforcement, policy, or risk conclusions.

An example Structural Relationship Deviation Module (SRDM) 36 includes code segments executed by one or more processors and configured to evaluate current or subsequently observed telemetry against established baseline relationship profiles in order to identify structural relationship deviations. As used herein, the term "structural relationship deviation" means a difference in the existence or structural characteristics of observed communication relationships between internal source systems and external destination entities relative to a baseline relationship profile, without attributing cause, intent, security posture, or risk. As used herein, the term "current or subsequently observed telemetry" means telemetry ingested after establishment of a baseline relationship profile and reflecting present or later-observed connectivity, regardless of whether such telemetry is processed in real time, near real time, or batch form.

In this example, the SRDM 36 receives, as inputs, persistent domain-centric relationship records representing current or newly observed communications derived from ingested telemetry, established baseline relationship profiles encoding historical structural connectivity patterns, and optional metadata associated with such relationship records, including directional indicators, observation window timestamps, and summary attributes such as frequency, duration, or temporal distribution. The SRDM 36 operates exclusively on metadata-level abstractions and does not inspect packet payload contents, session content, or application-layer logic.

The SRDM 36 identifies one or more types of structural relationship deviations. In some embodiments, a deviation corresponds to the emergence of a new relationship, meaning a communication relationship observed in current network flow telemetry that is absent from the applicable baseline relationship profile. In other embodiments, a deviation corresponds to the disappearance of an established relationship, meaning a relationship represented in the baseline profile that is not observed within a current observation window. In further embodiments, a deviation corresponds to a material change in relationship attributes, meaning a significant difference between observed and baseline characteristics such as communication frequency, duration, or temporal distribution. In still further embodiments, a deviation corresponds to a negative deviation, meaning a statistically significant reduction, degradation, or sustained absence of previously expected communications relative to a learned variability envelope associated with the baseline relationship.

For each persistent relationship record derived from current or subsequently observed telemetry, the SRDM 36 compares the record against a corresponding entry in the baseline relationship profile, if present, determines whether the observed communication represents a new relationship, a missing relationship, or a materially changed relationship, and quantifies the deviation using deterministic rules, statistical analysis, algorithmic heuristics, or combinations thereof applied to relationship-level metadata. Each detected deviation is annotated with metadata describing the deviation type, magnitude, and associated observation window, without inferring causality, risk classification, policy violation, or required response. In some embodiments, deviations are evaluated relative to learned variability envelopes derived from historical baseline states rather than fixed thresholds, thereby supporting adaptive deviation detection in dynamic or evolving network environments.

Identified deviations may be represented using one or more structural representations, including annotated relationship records indicating deviation type and magnitude, difference matrices comparing baseline relationship profiles to current observations, or graph-based overlays highlighting changed, emerging, or missing edges relative to baseline structural graphs. Such representations enable structural analysis of connectivity changes without reliance on individual flow events or raw telemetry.

The SRDM 36 preserves structural context by maintaining linkage between the persistent relationship record representing the current observation, the corresponding baseline relationship profile entry, and the associated deviation annotation. This preservation of linkage enables longitudinal analysis and subsequent investigation while maintaining independence from packet-level, session-level, or flow-level data.

In some embodiments, identified structural relationship deviations are provided as outputs to users, reporting systems, or downstream analytical components for review or further analysis. Such outputs convey the existence and type of structural deviations and may be filtered by observation window, source system, destination entity, or organizational context, without asserting cause, risk level, or enforcement action.

By evaluating current or subsequently observed telemetry against baseline relationship profiles to identify structural relationship deviations, the system converts transient network observations into durable structural insights, detects changes, drift, or disruption in internal-external communication patterns, preserves historical context for longitudinal analysis, and operates without packet inspection, enforcement, or policy evaluation, thereby providing a structural monitoring capability distinct from conventional event-centric network monitoring approaches.

Network Flow Reporting Module (NFRM) 38 includes code segments executable by the one or more processors to report at least one of the persistent domain-centric relationship records and the structural relationship deviations derived therefrom. As used herein, the term "reporting" means generating a human-readable, machine-readable, or visual representation of relationship records or deviations that conveys structural connectivity information without asserting causality, security risk, or policy compliance. Reporting may be performed on demand, periodically, or in response to detected changes and may be provided to users, dashboards, external systems, or downstream analytical components.

In some embodiments, reporting includes visualizing domain-centric relationship records using a flow-based diagram, including a Sankey diagram. As used herein, a "Sankey diagram" means a graphical representation in which nodes represent entities and directed links between nodes represent relationships, with link positioning and orientation conveying directionality and structural pairing rather than packet-level flow volume. In the context of the present system, nodes in the Sankey diagram may correspond to internal source systems, applications, or functional groupings on one side of the diagram and external domains, organizations, or services on the opposite side, while links represent persistent domain-centric relationship records constructed from observed north-south connectivity. Link presence indicates the existence of a relationship, and optional visual attributes, such as width, shading, or annotation, may reflect relationship persistence, recurrence, or other summary attributes without displaying individual network events.

Structural relationship deviations may also be reported using visual, tabular, or annotated representations. In some embodiments, deviations are reported by augmenting the Sankey diagram with visual indicators highlighting newly emerged relationships, missing relationships, or materially changed relationships relative to an established baseline. Such indicators may include color changes, dashed or emphasized links, or overlay annotations identifying deviation type and observation window, without asserting cause, severity, or required action. In other embodiments, deviations are reported as annotated relationship records, difference views comparing baseline and current structures, or machine-readable outputs suitable for integration with reporting, governance, or analytical workflows.

The reporting of domain-centric relationship records and structural relationship deviations preserves linkage to the underlying persistent relationship records and baseline profiles, thereby maintaining structural context across observation windows while remaining independent of individual flow events. Reporting does not require packet payload inspection, application-layer decoding, or enforcement logic and does not imply ownership, intent, or risk associated with any reported relationship.

By reporting persistent domain-centric relationship records and structural relationship deviations, including through structural visualizations such as Sankey diagrams, the system enables clear communication of internal-to-external connectivity structures and changes thereto over time, providing durable architectural insight distinct from conventional event-centric traffic reports.

Although network flow telemetry is collected from network boundary devices associated with a monitored organization, including on-premises or cloud-based firewalls owned, operated, or administered by that organization, the analytical representations, relationship records, and visualizations derived therefrom are not limited to an organization-centric perspective.

In some embodiments, persistent domain-centric relationship records constructed from owner-side telemetry may be analyzed or presented with a primary focus on internal systems of the monitored organization. In other embodiments, the same relationship records may be analyzed or presented with a primary focus on external domains, organizations, or suppliers, including views in which external entities are treated as the principal nodes or anchoring elements of a visualization.

Accordingly, graphical representations such as Sankey diagrams, matrices, or graph layouts may orient internal systems, external entities, or combinations thereof on either side or along any axis of the representation, without implying directionality of traffic origination, ownership of network infrastructure, or analytical priority.

Such re-orientation of analytical or visual perspective does not alter the underlying telemetry source or instrumentation model but instead reflects a transformation of the same persistent relationship records to support different analytical, governance, or architectural review contexts.

Figure 5:
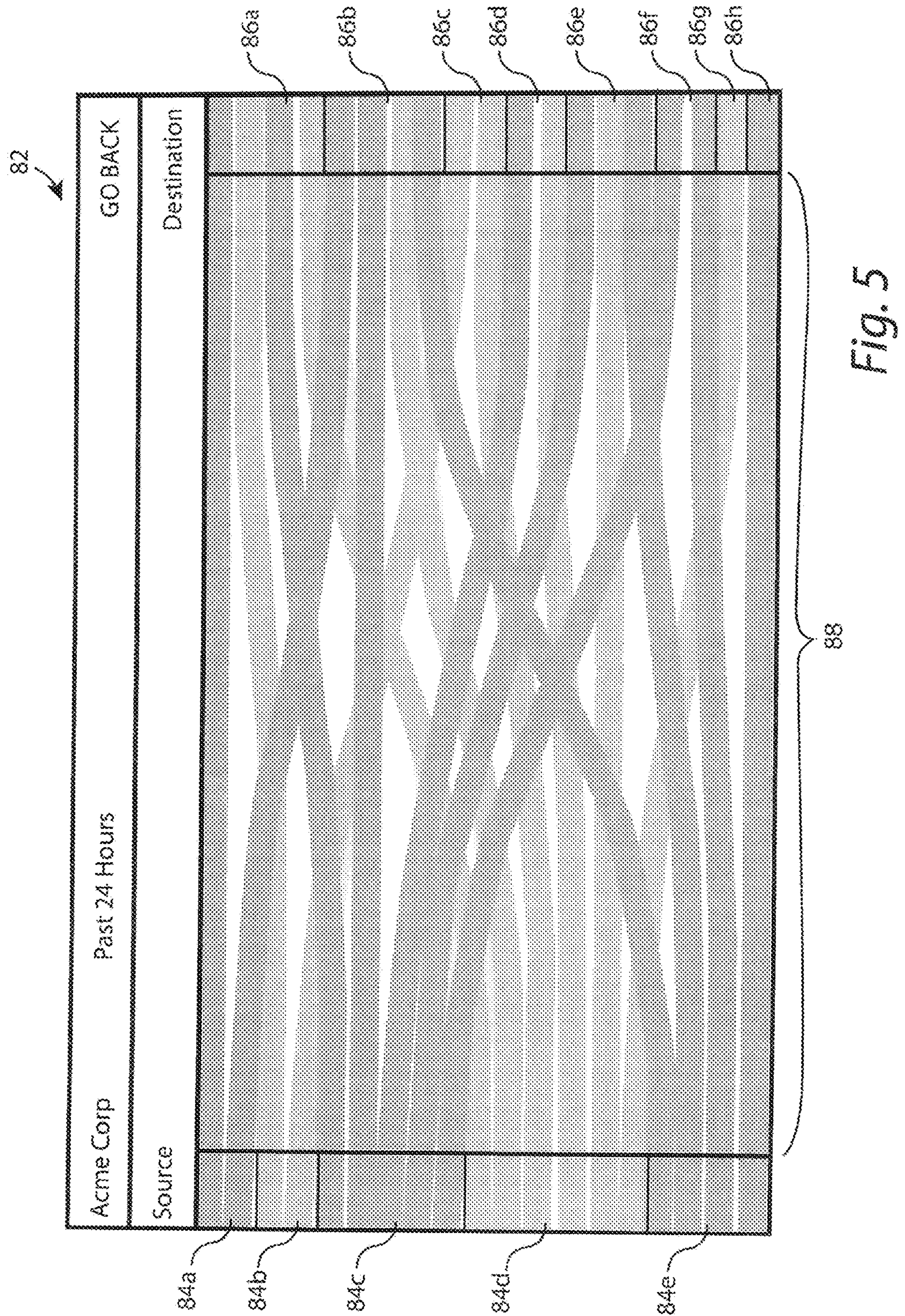
FIG. 5 is an example Sankey diagram illustrating relationships between source and destination nodes.

FIG. 5 is an example Sankey diagram ("connectivity relationship map") 82 illustrating relationships between source nodes 84*a*-84*e* of a company "Acme Corp." and destination nodes 86*a*-86*h* over a 24 hour time window using a number of directed links 88 to form a connectivity relationship map. In this example, the nodes 84*a*-84*e* are servers, clusters, devices or other entities within a LAN 12. The destination nodes 86*a*-86*h*, in this example, are cloud-based on internet 14 or servers, clusters, devices or other entities 20 communicating over the internet 14. By way of non-limiting examples, source node 84*a* can be AzureAD, source node 84*b* can be Commvault, source node 84*c* can be HAM-BG04, source node 84*d* can be Meditech Expanse Servers, and source node 84*e* can be Servers, SAN and 3$^{rd}$ party. By way of further non-limiting examples, destination node 86*a* can be Microsoft Corporation, destination node 86*b* is Not Available, destination node 86*c* is Azure Storage, destination node 86*d* is Advanced ICU Care, Inc., destination node 86*e* is Amazon Data Services Northern Virginia, destination node 86*f* is Amazon Technologies Inc., destination node 86*g* is Google LLC, and destination node 86*h* is Microsoft Limited. The connectivity relationship map 82 and associated analyses are derived from network metadata and telemetry and do not require deep packet inspection, payload content inspection, or inspection of application-layer data.

It should be noted that the example Sankey diagram of FIG. 5 is basic example with just source and destination nodes. More complex Sankey diagrams can also be generated with one or more layers of intermediate nodes, as will be apparent to those of skill in the art.

In some embodiments, the system may interface with one or more application workflow engines, including but not limited to distributed orchestration platforms such as Temporal or Chainlink. These systems often coordinate execution across disparate services, clouds, or AI subsystems in ways that may abstract or obscure the actual destination entities involved in communication. For example, an observed connection to a workflow coordinator may not reveal the underlying system or organizational boundary ultimately engaged by the workflow. To preserve accurate structural relationship mapping, the system may retrieve, infer, or validate the actual communication targets involved in such workflow-executed operations by ingesting workflow metadata, audit traces, control-plane signals, or engine-specific logs. This allows the persistent relationship records to reflect true end-to-end connectivity, even when intermediate execution patterns obscure destination linkage.

In some embodiments, the connectivity relationship map includes communications among distributed artificial intelligence (AI) system components operating across one or more environments. Such AI system components may include execution components configured to perform model-based processing, data retrieval and context assembly components, data preparation and transformation components, orchestration or workflow coordination components, interface components for exchanging data with external systems, state or storage components, and monitoring or governance components. The advanced network flow reporting and analysis described herein may observe and model relationships among such AI system components based on telemetry-derived connectivity and communication patterns, without requiring inspection of model logic, training processes, payload contents, or internal decision semantics.

In some embodiments, deviation indicators from multiple independent organizations are aggregated to identify correlated structural patterns associated with shared external entities, supporting early visibility into systemic disruptions affecting multiple participants.

In some embodiments, disruption affecting a learned relationship may be evaluated using one or more analytical measures, which may include statistical, machine learning-based, or artificial intelligence-based measures applied to the same relationship telemetry (i.e., multi-signal evaluation of relationship disruption). Such measures may include, by way of example, detection of cumulative deviation over recent observation windows, comparison against time-aware expected behavior, or probabilistic assessment of a transition from a normal operating condition to a degraded or interrupted condition. In other embodiments, disruption affecting a learned relationship may be identified using a single analytical measure without requiring corroboration from additional measures.

In some embodiments, the system may assign a confidence indication to a detected disruption, wherein confidence may increase as deviation persists across additional observation windows or as analytical measures corroborate the disruption and may decrease or clear if observed behavior returns within expected bounds.

In some embodiments, evaluation of relationship disruption may further be performed in a cadence-aware manner. For each learned relationship, expected communication frequency and temporal regularity may be learned, including variations by time of day or day of week. Absence, reduction, or degradation of activity may be interpreted relative to such expected cadence, thereby distinguishing true disruption from anticipated low-activity periods.

In some embodiments, baseline construction and deviation evaluation may be implemented using deterministic rules, statistical techniques, algorithmic heuristics, or optional machine-learning models applied to relationship metadata. Artificial intelligence is not required for operation of the system but may be optionally employed.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A network data traffic monitor and analyzer comprising:

at least one digital processor;

a network interface coupled to the digital processor; and digital memory including code segments executable by the at least one digital processor for (a) receiving north-south network flow telemetry via the network interface, the north-south network flow telemetry including metadata derived from at least one of a firewall, a router, or a cloud flow logging service without packet payload inspection, the north-south network flow telemetry including source and destination network identifiers;

(b) resolving the destination network identifiers into domain or organizational identifiers using one or more resolution techniques including at least one of: (i) domain name system (DNS) data, (ii) cloud-provider metadata, or (iii) registry-based attribution data;

(c) constructing, from the received telemetry, persistent domain-centric relationship records that represent observed communication pairings between network sources and destinations, aggregated over an observation window, as first-class analytical objects independent of individual network flow events;

(d) storing the persistent domain-centric relationship records in a data structure logically separate from the received telemetry such that the relationship records persist independently of retention of the telemetry;

(e) establishing baseline relationship profiles based upon the persistent domain-centric relationship records, the baseline relationship profiles comprising structural connectivity representations of relationships between network sources and destinations independent of packet-level or flow-level metrics;

(f) comparing subsequently received network flow telemetry, via corresponding persistent relationship records, against the baseline relationship profiles to identify structural relationship deviations including at least one of, (i) an emergence of a previously unobserved relationship, (ii) a disappearance of a previously established relationship, or (iii) a change in one or more structural attributes of a relationship; and (g) reporting at least one of the domain-centric relationship records and the structural relationship deviations.

2. The network data traffic monitor and analyzer of claim 1, wherein at least one of the firewall or router is a cloud-based virtual firewall or router.

3. The network data traffic monitor and analyzer of claim 1, wherein developing and storing persistent domain-centric relationship records comprises generating pairings using one or more pairing types selected from domain-to-domain, Internet Protocol (IP)-to-domain, domain-to-IP, or IP-to-IP.

4. The network data traffic monitor and analyzer of claim 1, wherein the persistent domain-centric relationship records include directional metadata indicating initiation or predominant data flow direction to support analysis of asymmetric communication patterns.

5. The network data traffic monitor and analyzer of claim 1, wherein baseline relationship profiles are represented as source-to-destination matrices encoding structural communication patterns.

6. The network data traffic monitor and analyzer of claim 1, wherein baseline relationship profiles are represented as destination-to-source matrices to identify shared external dependencies across multiple internal systems.

7. The network data traffic monitor and analyzer of claim 1, wherein identifying structural relationship deviations comprises detecting an emergence of a previously unobserved relationship pairing.

8. The network data traffic monitor and analyzer of claim 1, wherein identifying structural relationship deviations comprises detecting a disappearance of a previously established relationship pairing.

9. The network data traffic monitor and analyzer of claim 1, wherein identifying structural relationship deviations comprises detecting a change in one or more attributes of a relationship including frequency, volume, duration, or temporal distribution.

10. The network data traffic monitor and analyzer of claim 1, wherein baseline relationship profiles are maintained as evolving reference states that preserve historical structural context while incorporating newly observed stable relationships.

11. The network data traffic monitor and analyzer of claim 10, wherein baseline states are retained as historical baseline states to enable comparison to current relationship structures.

12. The network data traffic monitor and analyzer of claim 1, wherein comparing current network flow telemetry against baseline relationship profiles is performed using deterministic or statistical techniques.

13. The network data traffic monitor and analyzer of claim 1, wherein comparing current network flow telemetry against baseline relationship profiles optionally employs a machine-learning model applied to relationship metadata.

14. The network data traffic monitor and analyzer of claim 1, further comprising aggregating identified structural relationship deviations across multiple independent organizations associated with respective network environments.

15. The network data traffic monitor and analyzer of claim 14, wherein aggregating structural relationship deviations comprises identifying correlated deviation patterns associated with shared external domains or services.

16. The network data traffic monitor and analyzer of claim 1, wherein identifying structural relationship deviations further comprises detecting negative deviations characterized by reduction, degradation, suppression, or sustained absence of expected communications relative to baseline relationship profiles.

17. The network data traffic monitor and analyzer of claim 16, wherein negative deviations are evaluated relative to learned variability envelopes associated with each relationship rather than fixed thresholds.

18. The network data traffic monitor and analyzer of claim 16, wherein confidence of negative deviation identification is weighted based on historical reliability, predictability, and variance of the relationship.

19. The network data traffic monitor and analyzer of claim 16, wherein negative deviation detection supports identification of operational disruption, supplier outage, maintenance conditions, or ransomware-related encryption events independent of malicious attribution.

20. The network data traffic monitor and analyzer of claim 1, wherein one or more identified relationships are reconstructed based on metadata obtained from application workflow engines that coordinate distributed execution across multiple systems or services.

21. The network data traffic monitor and analyzer of claim 20, wherein the workflow engine metadata comprises logs, audit records, control-plane traces, or execution identifiers that enable inference of actual communication targets.

22. A computer-implemented method comprising:

(a) receiving north-south network flow telemetry via a network interface of a computer, the north-south network flow telemetry including metadata derived from at least one of a firewall, a router, or a cloud flow logging service without packet payload inspection, the north-south network flow telemetry including source and destination network identifiers;

(b) resolving the destination network identifiers into domain or organizational identifiers on the computer using one or more resolution techniques including at least one of: (i) domain name system (DNS) data, (ii) cloud-provider metadata, or (iii) registry-based attribution data;

(c) constructing, from the received telemetry, persistent domain-centric relationship records that represent observed communication pairings between network sources and destinations, aggregated over an observation window, as first-class analytical objects independent of individual network flow events on the computer;

(d) storing the persistent domain-centric relationship records in a data structure logically separate from the received telemetry such that the relationship records persist independently of retention of the telemetry;

(e) establishing baseline relationship profiles based upon the persistent domain-centric relationship records, the baseline relationship profiles comprising structural connectivity representations of relationships between network sources and destinations independent of packet-level or flow-level metrics;

(f) comparing subsequently received network flow telemetry, via corresponding persistent relationship records, against the baseline relationship profiles to identify structural relationship deviations on the computer including at least one of, (i) an emergence of a previously unobserved relationship, (ii) a disappearance of a previously established relationship, or (iii) a change in one or more structural attributes of a relationship; and (g) reporting at least one of the domain-centric relationship records and the structural relationship deviations by the computer.

23. The computer-implemented method of claim 22, wherein at least one of the firewall or router is a cloud-based virtual firewall or router.

24. The computer-implemented method of claim 22, wherein developing and storing persistent domain-centric relationship records comprises generating pairings using one or more pairing types selected from domain-to-domain, Internet Protocol (IP)-to-domain, domain-to-IP, or IP-to-IP.

25. The computer-implemented method of claim 22, wherein the persistent domain-centric relationship records include directional metadata indicating initiation or predominant data flow direction to support analysis of asymmetric communication patterns.

26. The computer-implemented method of claim 22, wherein baseline relationship profiles are represented as source-to-destination matrices encoding structural communication patterns.

27. The computer-implemented method of claim 22, wherein baseline relationship profiles are represented as destination-to-source matrices to identify shared external dependencies across multiple internal systems.

28. The computer-implemented method of claim 22, wherein identifying structural relationship deviations comprises detecting an emergence of a previously unobserved relationship pairing.

29. The computer-implemented method of claim 22, wherein identifying structural relationship deviations comprises detecting a disappearance of a previously established relationship pairing.

30. A non-transitory computer-readable medium storing code segments that, when executed by one or more processors, cause performance of operations comprising:

(a) receiving north-south network flow telemetry via a network interface of a computer, the north-south network flow telemetry including metadata derived from at least one of a firewall, a router, or a cloud flow logging service without packet payload inspection, the north-south network flow telemetry including source and destination network identifiers;

(b) resolving the destination network identifiers into domain or organizational identifiers using one or more resolution techniques including at least one of: (i) domain name system (DNS) data, (ii) cloud-provider metadata, or (iii) registry-based attribution data;

(c) constructing, from the received telemetry, persistent domain-centric relationship records that represent observed communication pairings between network sources and destinations, aggregated over an observation window, as first-class analytical objects independent of individual network flow events;

(d) storing the persistent domain-centric relationship records in a data structure logically separate from the received telemetry such that the relationship records persist independently of retention of the telemetry;

(e) establishing baseline relationship profiles based upon the persistent domain-centric relationship records, the baseline relationship profiles comprising structural connectivity representations of relationships between network sources and destinations independent of packet-level or flow-level metrics;

(f) comparing subsequently received network flow telemetry, via corresponding persistent relationship records, against the baseline relationship profiles to identify structural relationship deviations including at least one of, (i) an emergence of a previously unobserved relationship, (ii) a disappearance of a previously established relationship, or (iii) a change in one or more structural attributes of a relationship; and (g) reporting at least one of the domain-centric relationship records and the structural relationship deviations.

* * * * *